(12) United States Patent
Faust

(10) Patent No.: US 7,967,707 B2
(45) Date of Patent: Jun. 28, 2011

(54) BELT-DRIVEN CONICAL-PULLEY TRANSMISSION WITH IMPROVED TOWING SUITABILITY

(75) Inventor: Hartmut Faust, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 264 days.

(21) Appl. No.: 11/640,833

(22) Filed: Dec. 17, 2006

(65) Prior Publication Data

US 2007/0161441 A1   Jul. 12, 2007

Related U.S. Application Data

(60) Provisional application No. 60/752,699, filed on Dec. 21, 2005.

(30) Foreign Application Priority Data

Dec. 17, 2005   (DE) .......................... 10 2005 060 598

(51) Int. Cl.
*F16H 63/06* (2006.01)
(52) U.S. Cl. ......................................................... 474/28
(58) Field of Classification Search ..................... 474/28, 474/12, 18, 44–45, 69–70
See application file for complete search history.

(56) References Cited

U.S. PATENT DOCUMENTS

| | | | | |
|---|---|---|---|---|
| 4,496,335 A * | 1/1985 | Quick et al. | ..................... | 474/15 |
| 4,722,718 A * | 2/1988 | Eugen | ............................. | 474/19 |
| 4,913,684 A * | 4/1990 | Mantovaara et al. | ........... | 474/12 |
| 5,879,253 A * | 3/1999 | Friedmann et al. | ............. | 474/18 |
| 6,095,943 A | 8/2000 | Reuthal | ........................... | 477/86 |
| 6,336,878 B1 * | 1/2002 | Ehrlich et al. | ................... | 474/28 |
| 6,336,879 B1 * | 1/2002 | Schmid et al. | ................... | 474/28 |
| 6,342,027 B1 * | 1/2002 | Suzuki | ............................... | 477/5 |
| 6,440,039 B1 * | 8/2002 | Warren | ............................ | 477/86 |
| 6,716,129 B2 * | 4/2004 | Bott et al. | ...................... | 475/210 |
| 6,786,844 B2 * | 9/2004 | Fritzer et al. | ................... | 475/210 |
| 2004/0214685 A1 * | 10/2004 | Korenjak et al. | ............... | 477/44 |
| 2005/0181899 A1 | 8/2005 | Plath et al. | ....................... | 474/18 |

FOREIGN PATENT DOCUMENTS

| | | |
|---|---|---|
| DE | 199 39 435 A1 | 3/2000 |
| DE | 199 20 803 A1 | 12/2000 |
| DE | 10203944 A1 * | 8/2002 |
| DE | 103 54 157 A1 | 6/2005 |
| EP | 1 473 182 A1 | 11/2004 |

* cited by examiner

*Primary Examiner* — Robert A Siconolfi
*Assistant Examiner* — Stephen Bowes
(74) *Attorney, Agent, or Firm* — Alfred J. Mangels

(57) ABSTRACT

An input-side drive arrangement for a belt-driven conical-pulley transmission includes an input shaft that is rigidly connected to an axially fixed disk, and an axially movable disk that can be shifted axially on the shaft and is rotationally fixed to the shaft. A torque-sensing device has a first shaped surface that is rigidly connected to the shaft and a second shaped surface that is rigidly connected to a sensing piston that surrounds the shaft and is rotatable and axially movable relative to the shaft. The sensing piston engages a rotationally drivable input wheel and can be subjected to hydraulic pressure from the side facing the movable disk. The rotationally fixed and axially movable engagement between the sensing piston and the input wheel is such that the engagement is disconnected when there is torque acting from the movable disk and the sensing piston is not under hydraulic pressure.

8 Claims, 4 Drawing Sheets

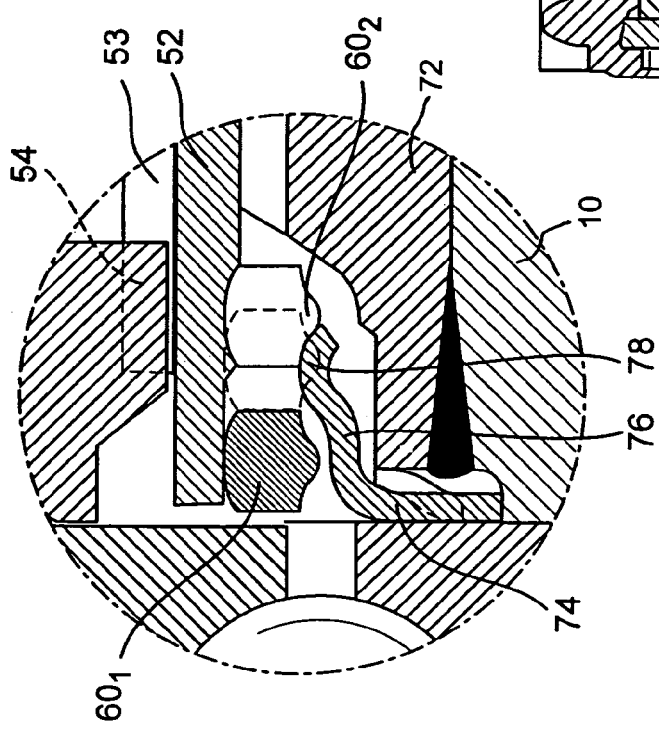
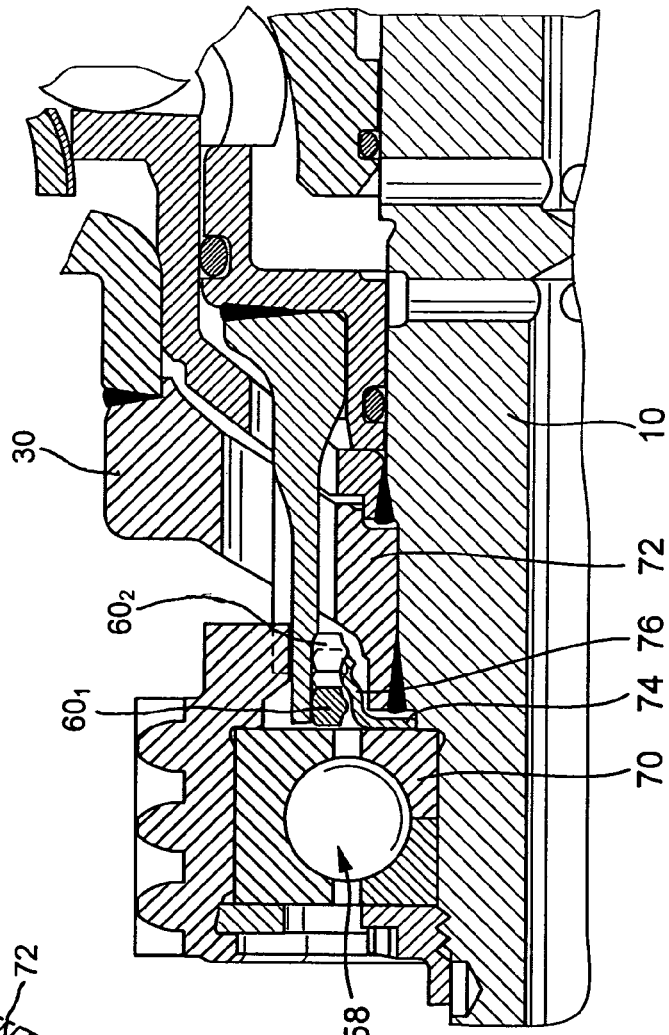
Fig. 3b
Fig. 3a

BELT-DRIVEN CONICAL-PULLEY TRANSMISSION WITH IMPROVED TOWING SUITABILITY

BACKGROUND OF THE INVENTION

1. Field of the Invention

The present invention relates to a method for improving the towing suitability of a motor vehicle equipped with a belt-driven conical-pulley transmission. The invention also relates to an input-side drive arrangement for a belt-driven conical-pulley transmission and to an electronic control unit for controlling a belt-driven conical-pulley transmission.

2. Description of the Related Art

Belt-driven conical-pulley transmissions, such as are employed, for example, in motor vehicles, generally include two pairs of conical disks that are encircled by an endless torque-transmitting means, for example a special chain. By altering the spacing between the conical disks of each conical disk pair in opposite directions, the transmission ratio of the transmission can be varied continuously.

One problem in motor vehicles equipped with such a belt-driven conical-pulley transmission is that such motor vehicles can be towed only within narrowly defined conditions, in particular in the event of a failure of the drive engine, in order that no damage occurs, particularly because of a lack of oil pressure or hydraulic pressure supply.

An object of the invention is to reduce the towing problems that exist when motor vehicles equipped with a belt-driven conical-pulley transmission are towed.

SUMMARY OF THE INVENTION

In accordance with one aspect of the present invention, a method is provided for improving the towing suitability of a motor vehicle equipped with a belt-driven conical-pulley transmission. In the present method, the torque-transmitting engagement between the belt-driven conical-pulley transmission and an input component that is drivable by a drive engine of the motor vehicle is interrupted when there is torque acting from the vehicle on the belt-driven conical-pulley transmission, and there is no hydraulic pressure acting on the belt-driven conical-pulley transmission.

Advantageously, the torque-transmitting engagement can be restored again merely by applying hydraulic pressure to the belt-driven conical-pulley transmission.

That procedure ensures that when the drive engine is operating, i.e., when the hydraulic fluid pump is running, torque-transmitting engagement exists between an input component drivable by the drive engine and the belt-driven conical-pulley transmission when the start-up clutch or torque-transmitting converter is engaged.

Another solution to the problem to which the present invention is directed is achieved with a specially constructed pair of conical disks for a belt-driven conical-pulley transmission. The pair of conical disks includes an input shaft that is rigidly connected to a fixed conical disk, and a movable conical disk that can be shifted axially on the shaft and is rotationally fixed to the shaft. A torque-sensing unit is provided having a first shaped surface that is rigidly connected to the shaft, and a second shaped surface that is rigidly connected to a sensing piston that surrounds the shaft and that is axially movable and rotatable relative to the shaft. The sensing piston is engaged with a rotatably-drivable input wheel in rotationally fixed and axially movable engagement, and it can be subjected to hydraulic pressure from the side facing the movable disk. The shaped surfaces are designed in such a way that when there is an increase in the torque acting between the sensing piston and the movable disk, the sensing piston moves in the direction of the movable disk by the rolling of rolling elements that are positioned between the shaped surfaces. The rotationally fixed and axially movable engagement between the sensing piston and the input wheel is of such a nature that it is released when there is a torque acting from the movable disk and the sensing piston is not under hydraulic pressure.

With an input-side drive arrangement configured in accordance with the invention, preferably an elastically deformable part is provided that initially counteracts an axial movement of the sensing piston from an engagement position, in which it is engaged with the input wheel in a way that transmits torque, to a release position. After a maximum force is exceeded, the elastically deformable part forces the sensing piston into a release position at which the engagement with the input wheel is released.

The shaped surfaces are advantageously formed in such a way that increasing the rotational speed of the shaft produces a force acting on the sensing piston in the direction of a shift toward the movable disk.

The sensing piston can have on its side facing away from the movable disk axially-directed arms that are circumferentially spaced from each other at a predetermined distance. The arms are provided with axial teeth that together form a circumferentially-arranged tooth system that meshes with a circumferentially-arranged tooth system of the input wheel in a rotationally fixed, axially movable and separable tooth engagement.

Advantageously, a support ring is provided that is in contact with the arms of the sensing piston on the side radially opposite the axial teeth of the arms. The support ring serves to force the teeth of the arms to mesh with the circumferentially-arranged teeth of the input wheel.

In accordance with a further aspect of the present invention, an electronic control unit is provided for a belt-driven conical-pulley transmission having at least one pair of conical disks mounted as described above and including a start-up clutch. The electronic control unit is advantageously designed in such a way that the start-up clutch, under the control of the control unit, cannot be operated until the control unit detects torque-transmitting engagement between an input wheel that is drivable by a drive engine when the start-up clutch is engaged, and the sensing piston.

BRIEF DESCRIPTION OF THE DRAWINGS

The structure, operation, and advantages of the present invention will become further apparent upon consideration of the following description, taken in conjunction with the accompanying drawings in which:

FIG. 3a is an enlarged, fragmentary cross-sectional view showing a modified embodiment of the torque input end at the movable conical disk of an input-side drive arrangement;

FIG. 3b is a further enlarged, detail view of a portion of the embodiment shown in FIG. 3a.

DESCRIPTION OF THE PREFERRED EMBODIMENTS

Figure 1:
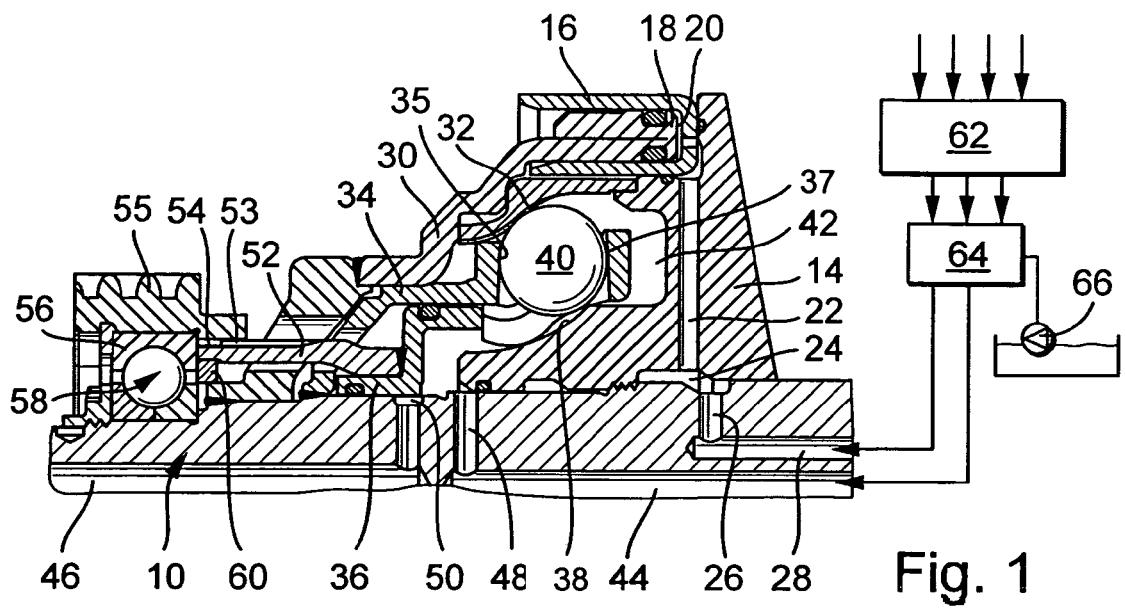
FIG. 1 is a partial longitudinal cross sectional view of a movable disk actuation arrangement of an input-side drive of a belt-driven conical-pulley transmission in accordance with an embodiment of the present invention.
Figure 1A:
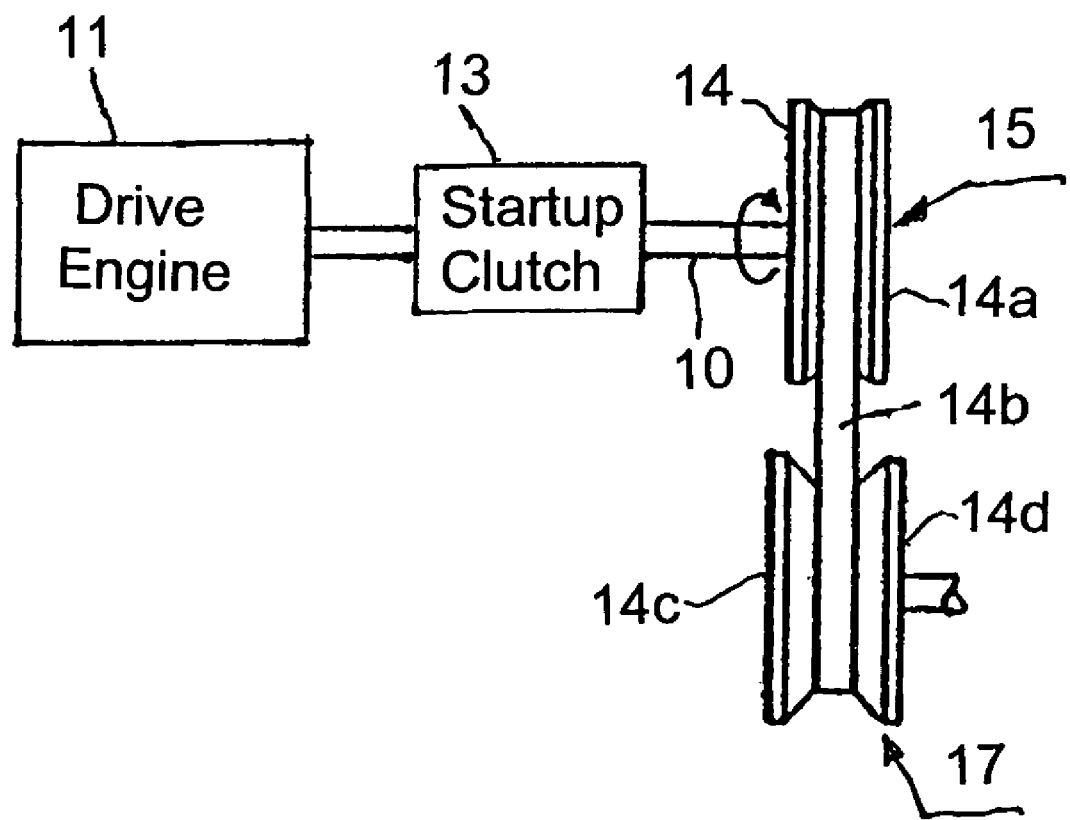
FIG. 1a is a diagrammatic view of a belt-driven conical-pulley transmission and associated drive engine and startup clutch.

Referring to FIG. 1a of the drawings, an input-side drive arrangement 15 of a belt-driven conical-pulley transmission includes a drive engine 11, a startup clutch 13, and an input shaft 10 that is integrally formed with a fixed conical disk 14a. Positioned on shaft 10, coaxial with and spaced from the fixed disk 14a is an axially movable disk 14 that is non-rotatably connected to the shaft 10. An endless torque transmitting means 14b passes between the conical surfaces of the fixed and movable disks of input side drive arrangement 15 and also between the conical surfaces of another, similar pair of conical disks 14c and 14d of an output unit 17.

As shown in FIG. 1, on the back side of movable disk 14, the side opposite from the fixed disk 14a, and in its radially outer region, is rigidly attached a cylindrical ring 16 having two walls spaced at a radial distance from each other to define an annulus. A piston 18 operates within the annulus so that on the right side of piston 18 as viewed in FIG. 1 a first pressure chamber 20 is formed. Chamber 20 can be subjected to hydraulic pressure through radial bores 22 formed in movable disk 14, an annular space 24 between movable disk 14 and shaft 10, and a radial bore 26 and an axial bore 28 formed in shaft 10. The hydraulic pressure is changeable to adjust the transmission ratio.

Piston 18, which is of annular form, is rigidly connected to a support ring wall 30 that is generally cup-shaped and is rigidly connected to shaft 10. An annular component 34 formed with first shaped surfaces 32 is rigidly attached on the inside of the support ring wall 30.

Also positioned within the support ring wall 30, and axially movable, is a sensing piston 36 which is of generally annular form and is sealed against the circumferential surface of shaft 10 and against an inner circumferential surface of annular component 34. Sensing piston 36 is designed with a projection directed toward movable disk 14, on the back of which second shaped surfaces 38 are formed that constitute countersurfaces to the first shaped surfaces 32. Between shaped surfaces 32 and 38 are rolling bodies, in the illustrated example balls 40, which are guided between ball guide surfaces 35, 37 carried by annular component 34

Between sensing piston 36 and movable disk 14 a second pressure chamber 42 is formed, which can be subjected to hydraulic fluid pressure through a supply conduit 44 formed in shaft 10, the hydraulic fluid being removable through a drain conduit 46 that is also formed in shaft 10.

The effective cross-sectional area at the outlet of the supply conduit 48 that leads into the second pressure chamber 42 is determined by the axial position of movable disk 14. The free cross section of the drain opening 50 leading out of the second pressure chamber 42 is determined by the position of sensing piston 36. Sensing piston 36 includes axially-extending arms 52 that pass through apertures in the annular component 34 and that are preferably equally circumferentially spaced. Arms 52 are integral with sensing piston 36, either rigidly connected to it or formed in a single piece on a separate part which is welded to the sensing piston, for example. The radially-outward surfaces of the arms 52 are provided with axially-extending radial teeth 53 that mesh with inner teeth 54 of an input wheel 55, which is supported and is axially substantially immovable on an external shell 56 of a bearing 58.

To support the free outer ends of the arms 52 of sensing piston 36, a support ring 60 is provided, which is in contact with the radially inwardly-lying sides of the end regions of the arms 52, to hold the outer teeth 53 of arms 52 securely meshed with the inner teeth 54 of input wheel 55.

An electronic control unit 62 is provided to control the conical disk pair, as well as the pressure chambers of the other conical disk pair (not shown) that are part of the belt-driven conical-pulley transmission. Inputs to electronic control unit 62 are values that are relevant for setting the transmission ratio of the transmission, such as the position of a selector lever, the position of an accelerator pedal, the rotational speed of the drive engine (not shown), the vehicle speed, and the like. Outputs of the electronic control unit 62 are connected to a valve module 64, which provides the supply conduit 44 with hydraulic pressure supplied by a hydraulic pump 66 and provides hydraulic pressure to the axial bore 28 that sets the transmission ratio of the transmission. The drain conduit 46 is connected to a return conduit that returns hydraulic fluid to the hydraulic fluid reservoir.

The construction and the function of the conical disk pair described so far are known and will therefore be explained only briefly.

When torque from the rotatably drivable input wheel 54 acts on sensing piston 36, that torque is transmitted by the second shaped surfaces 38, the balls 40 and the first shaped surfaces 32 to the support ring wall 30 and thus to the shaft 10. The shaped surfaces are formed so that as the input torque increases sensing piston 36 moves to the right, as viewed in FIG. 1, so that the drain opening 50, which is not initially completely covered by the sensing piston in the basic or starting position of the movable disk shown in FIG. 1, is increasingly closed. As the effective size of the drain opening 50 becomes smaller, the pressure in second pressure chamber 42 increases, so that a pressure that is a function of the input torque acts on movable disk 14. The transmission ratio adjustment is made primarily by means of the hydraulic pressure fed to the supply conduit 44.

When pump 66 is not running, or there is no hydraulic pressure on the movable disk shown in FIG. 1, and when there is torque acting from movable disk 14 or shaft 10, i.e., when the vehicle is being towed and the drive engine is idle or input wheel 55 is not being driven, sensor piston 36 is forced to the right as viewed in FIG. 1, by the balls 40 as a result of the torque acting between the shaped surfaces 32 and 38. That forcing of sensing piston 36 to the right is advantageously reinforced as the rotational speed of shaft 10 increases, as a result of the design of the shaped surfaces 32 and 38, in such a way that the sensing piston 36 is forced further toward the right by the centrifugal force acting outwardly on the balls 40. Thereby, when the vehicle is towed, that causes sensing piston 36 to move to its furthest possible position to the right, shown in FIG. 2, which is defined in the example of FIG. 2 by a stop of support ring 60 against a flange at the attachment region of support ring wall 30 on shaft 10.

Figure 2:
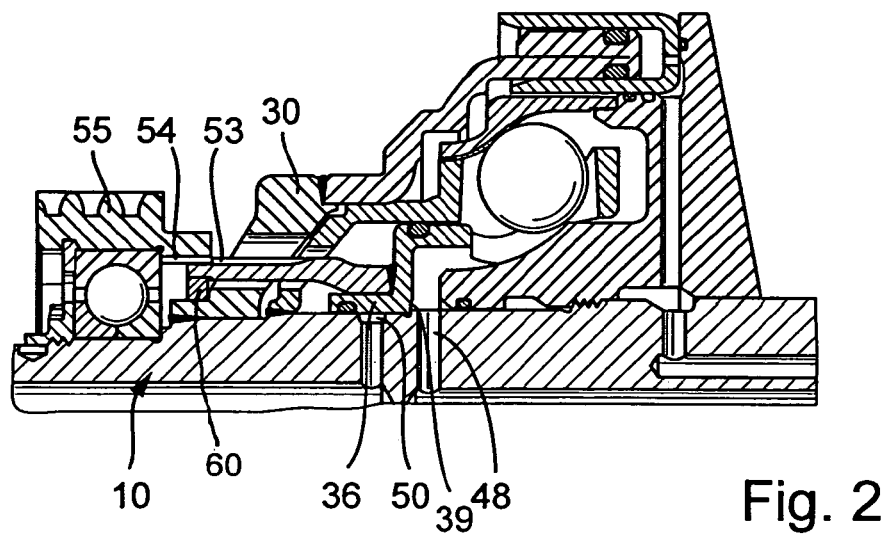
FIG. 2 is a view similar to that of FIG. 1, showing the movable disk position when the vehicle is being towed.

The axial extent of the inner teeth 54 of input wheel 55 and of the outer teeth 53 of the arms 52 of sensing piston 36 are coordinated with each other in such a way that in the "towing position" of sensing piston 36 shown in FIG. 2, the teeth 53 and 54 no longer overlap, that is, they are not in meshing engagement. The flow of torque between input wheel 55 and the belt-driven transmission is thus interrupted. Hence, during towing no speed of rotation occurs at the clutches (not shown) for forward and backward travel, nor in the planetary reversing gear set (which is situated between driving wheel 55 and the drive engine, but is not shown). It is possible to tow for unlimited lengths of time and at maximum speeds that are no longer dependent on the tooth lubrication conditions.

The separation of torque between the two tooth arrangements 53 and 54 is normally accomplished not only while the vehicle is moving, when only the drive engine, and hence pump 66, is turned off, since due to the complete filling with pressurized oil, despite the absence of static pressure, due to the rotation of shaft 10 centrifugal oil pressure exists at the sensing piston, which impedes sensing piston 36 from moving to the furthest possible position to the right that is shown in FIG. 2. Even when the vehicle is pushed slowly while the drive engine is not running no separation occurs, since due to the slow rotation of shaft 10 the centrifugal force influence of the balls 40 acting in the direction of a separation is lacking.

Through appropriate design of the individual components it is possible to cause the interruption of torque transmission between driving wheel 55 and sensing piston 36 to occur only if the vehicle is towed with the engine not running, and with the oil pump consequently not running, and at a speed greater than a predetermined speed.

The transmission of torque is brought about when starting the engine and thereby again operating pump 66 solely through the pressurized second pressure chamber 42 on sensing piston 52.

FIG. 1 shows the position of movable disk 14 at the maximum possible underdrive. FIG. 2 shows the towing position of the movable disk. Supply conduit 48 is thereby completely open.

To support the restoration of the torque engagement when adjusting sensing piston 36 to the left as viewed in FIG. 2, the right-side end faces of the inner teeth 54 and/or the left-side end faces of the outer teeth 53 of arms 52 are contacted in an advantageous manner.

To prevent an unwanted premature restoration of torque transmission, an arrangement is advantageously provided whereby a force must be overcome when passing from the torque transmission position to the disconnected position and vice versa. An example of such an arrangement is shown in FIGS. 3*a* and 3*b*.

Figure 4:
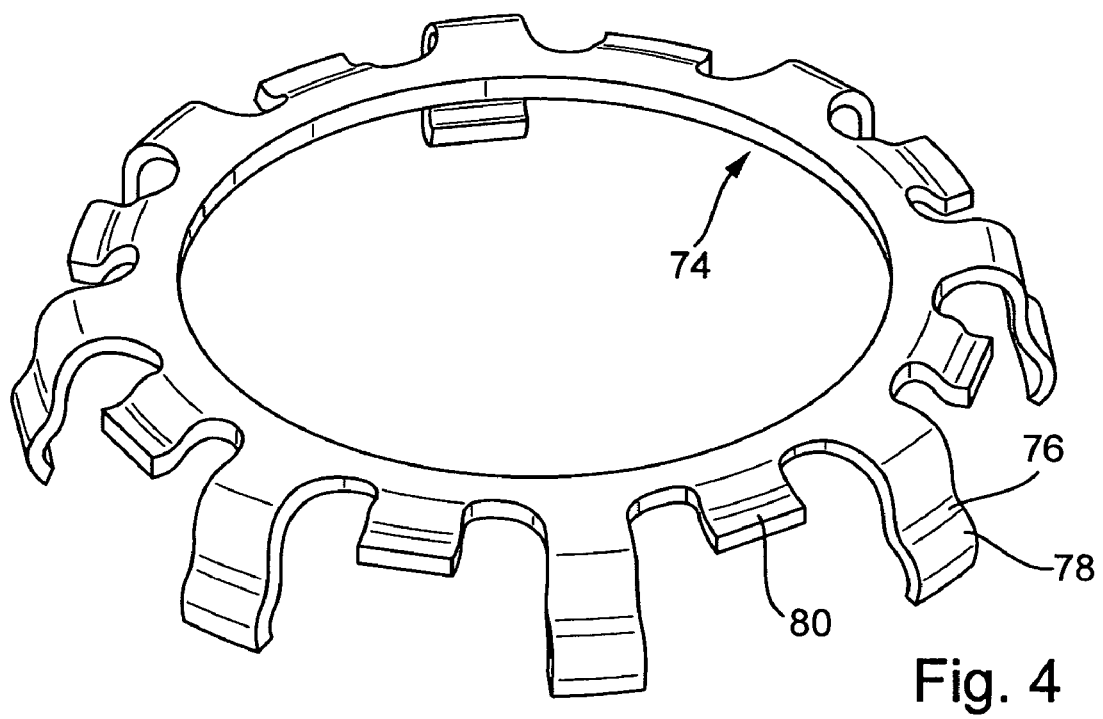
FIG. 4 is a perspective view of a spring ring.

As viewed in FIG. 3*a*, positioned between an internal shell 70 of bearing 58 and a flange 72 by means of which support ring wall 30 is rigidly connected to shaft 10 is a spring ring 74, which is shown enlarged in the detail view in FIG. 3*b* and in the perspective view in FIG. 4.

Spring ring 74 has elastically deformable arms 76, which have projections 78 that are situated in the path of motion of support ring 60, along which the support ring moves when it moves together with the sensing piston 36 or its arms 52, from the rest position as viewed in FIG. 1 (designated as 60$_1$ in FIGS. 3*a* and 3*b*) to the release position as viewed in FIG. 2 (designated as 60$_2$ in FIGS. 3*a* and 3*b*). When moving from position 60$_1$ to position 60$_2$, the outward crowned or convex inward underside of support ring 60 must bend arm 76 downward, so that the force with which the sensing piston must be moved initially increases and then, after passing the projection 78, again decreases. That "detent process" occurs in both directions.

It can also be seen in FIG. 3*b* that the axial length of engagement between the teeth 53 and 54 is somewhat smaller than the travel distance of arms 52 of sensing piston 36.

With the help of spring ring 74, whose deformability and/or axial positioning is additionally supported by bent tabs 80, which rest on the outer surface of flange 72, the sensing piston 36 is held at the new position each time with defined force when it has moved from the one position to the other. That prevents an unwanted premature restoration of the transmission of torque, for example during the stopping procedure after towing, which could result in unwanted noises.

The detent latching illustrated with the example of spring ring 74 can be accomplished in various ways. For example, sealing O-rings can lead into bevels. A sheet-metal spring with spring lugs that apply elastic forces could be used, where the sheet-metal spring, like the spring ring, can be a simple formed sheet metal part. Additional alternatives are a compression spring, a spiral spring, a spring strip positioned between the balls, centrifugal oil collection chambers that effect an equalization for the centrifugal oil on the pressure side, additional balls that bring about equalizing forces through centrifugal forces, spring-loaded arresting pins, parts attracted to each other by magnetic forces, an axial wavy-shaped washer, etc.

The described disconnection of the transmission of torque during start-up is advantageously ensured by the fact that control unit 62, with the help of a suitable sensor, for example an oil pressure sensor, does not release the operability of the start-up clutch until hydraulic pressure in pressure chamber 42 is ensured, so that the transfer of torque between driving wheel 55 and sensing piston 36 during start-up is guaranteed. Furthermore, such a device can be used to disconnect the power train of the vehicle automatically if there is insufficient oil pressure, for example as a result of leakage, and thereby prevent slippage of the endless torque-transmitting means of the belt-driven transmission.

The invention described above in exemplary form can be modified in many ways. For example, the axial teeth 53 and 54 can be replaced by an axial jaw engagement between a connected corresponding end face of input wheel 55 and the end faces of the arms 52. The teeth 53 and 54 can also be designed so that drive wheel 55 is provided with external teeth and the arms 52 with internal teeth. Support ring 60, which is not obligatory, is then advantageously positioned on the radial outer side of the arms 52. If the support ring is absent and spring ring 74 is present, the arms are provided with lugs to deform the spring ring.

Although particular embodiments of the present invention have been illustrated and described, it will be apparent to those skilled in the art that various other changes and modifications can be made without departing from the spirit of the present invention. It is therefore intended to encompass within the appended claims all such changes and modifications that fall within the scope of the present invention.

What is claimed is:

1. A method for improving the towing suitability of a motor vehicle equipped with a belt-driven conical-pulley transmission, said method comprising the steps of:
    providing torque-transmitting engagement between an input unit and an output unit of a belt-driven conical-pulley transmission having respective hydraulically-controlled conical disk pairs forming part of the input unit and of the output unit, each disk pair including an axially fixed conical disk and an axially movable conical disk that is movable by hydraulic pressure, wherein the input unit of the transmission is drivable by a drive engine of a motor vehicle to transmit an input torque from the drive engine to the output unit to drive wheels carried by the vehicle;
    sensing a torque input to the transmission output unit from movement of the wheels of the vehicle;
    sensing an absence of hydraulic pressure acting on the axially movable conical disks of the transmission;
    interrupting torque-transmitting engagement between the drive engine and the transmission when an input torque acts on the output unit of the belt-driven conical pulley transmission from movement of the wheels of the vehicle and in the absence of sensed hydraulic pressure acting on the axially movable conical disks of the belt-driven conical-pulley transmission;
    providing a detent means between a drive element operatively connected with the drive engine and a hydraulically operable sensing piston within the input unit for preventing unwanted premature restoration of torque transmission; and maintaining the interrupted torque-transmitting engagement between the drive engine and the transmission by the detent means during the time an input torque acts on the output unit of the belt-driven conical-pulley transmission from movement of the wheels of the vehicle and in the absence of sensed hydraulic pressure acting on the axially movable conical disks of the transmission.

2. The method in accordance with claim 1, including the step of restoring torque-transmitting engagement between the belt-driven conical-pulley transmission and the drive engine when there is hydraulic pressure provided at a pressure level to control the axially movable conical disks of the belt-driven conical-pulley transmission and to shift the sensing piston over the detent means to a torque-transmitting engagement position between the drive engine and the transmission.

3. An input-side drive arrangement for a belt-driven conical-pulley transmission, which drive arrangement comprises:
a transmission input shaft that is rigidly connected to a fixed conical disk;
an axially movable input side conical disk that is nonrotationally carried on the transmission input shaft;
a torque sensing unit having a first shaped surface that is rigidly connected to the transmission input shaft and a second shaped surface that is rigidly connected to a sensing piston that surrounds the transmission input shaft and is rotatable and axially movable relative to the transmission input shaft, wherein the sensing piston is engageable with a rotatable input wheel in a rotationally fixed and axially movable engagement and is subjected to hydraulic pressure at a side facing the axially movable input side disk, wherein the shaped surfaces are formed so that when torque acting between the sensing piston and the axially movable input side disk increases the sensing piston moves toward the axially movable input side disk by rolling of rolling elements positioned between the shaped surfaces; and
wherein the rotationally fixed and axially movable engagement between the sensing piston and the input wheel is effected by interengaged axial teeth carried by each of the sensing piston and the input wheel, and wherein axial lengths of the axial teeth of each of the sensing piston and of the input wheel are selected so that rotational connection of the sensing piston and the input wheel is disengaged when there is torque input to the transmission from the input side axially movable disk and the sensing piston moves toward the axially movable disk when the sensing piston is not under hydraulic pressure.

4. The input-side drive arrangement in accordance with claim 3, wherein an elastically deformable component is provided which initially counteracts axial movement of the sensing piston from an engagement position in which the sensing piston is engaged with the input wheel to transmit torque, to a disengaged position, and after a maximum axial force is exceeded the deformable component forces the sensing piston into a disengaged position in which the engagement of the sensing piston with the input wheel is disconnected.

5. The input-side drive arrangement in accordance with claim 3, wherein the shaped surfaces are formed so that as the rotational speed of the shaft increases a force acts on the sensing piston in the direction of a shift of the sensing piston toward the movable disk.

6. The input-side drive arrangement in accordance with claim 3, wherein the sensing piston includes axially-directed, circumferentially-spaced arms on its side facing away from the movable disk, wherein the arms include axial teeth that mesh with axial teeth carried by the input wheel for axially-movable engagement and disengagement of the sensing piston and the input wheel.

7. The input-side drive arrangement in accordance with claim 6, including a support ring in contact with the arms of the sensing piston on arm surfaces that are radially opposite the teeth of the arms, for forcing the teeth of the arms to mesh with the teeth of the input wheel.

8. The input-side drive arrangement in accordance with claim 3, including an electronic control unit for controlling movement of the movable disk, and a start-up clutch, wherein the start-up clutch is controlled by the electronic control unit so that the clutch is not engageable until the electronic control unit detects torque-transmitting engagement between the input wheel and the sensing piston of the torque sensing unit.

* * * * *